United States Patent
Tysowski

(10) Patent No.: US 8,648,747 B2
(45) Date of Patent: *Feb. 11, 2014

(54) METHOD OF DOWNLOADING EPHEMERIS DATA BASED ON USER ACTIVITY

(75) Inventor: Piotr Konrad Tysowski, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 839 days.

This patent is subject to a terminal disclaimer.

(21) Appl. No.: 12/612,076

(22) Filed: Nov. 4, 2009

(65) Prior Publication Data

US 2010/0045521 A1    Feb. 25, 2010

Related U.S. Application Data

(63) Continuation of application No. 11/668,068, filed on Jan. 29, 2007, now Pat. No. 7,633,438.

(51) Int. Cl.
*G01S 19/25* (2010.01)
*G01S 19/27* (2010.01)

(52) U.S. Cl.
USPC .................. 342/357.64; 342/357.66

(58) Field of Classification Search
USPC ........... 342/357.46, 357.64, 357.66; 701/468, 701/470
See application file for complete search history.

(56) References Cited

U.S. PATENT DOCUMENTS

| | | | |
|---|---|---|---|
| 5,587,715 A * | 12/1996 | Lewis | 342/357.24 |
| 7,026,984 B1 | 4/2006 | Thandu et al. | |
| 7,633,438 B2 * | 12/2009 | Tysowski | 342/357.64 |
| 2002/0111171 A1 | 8/2002 | Boesch et al. | |
| 2005/0168353 A1 * | 8/2005 | Dement et al. | 340/995.1 |
| 2007/0155489 A1 * | 7/2007 | Beckley et al. | 463/29 |

FOREIGN PATENT DOCUMENTS

| | | |
|---|---|---|
| WO | 00/13034 A1 | 3/2000 |
| WO | 2004/031800 A1 | 4/2004 |

OTHER PUBLICATIONS

Office Action from corresponding Canadian Office Action dated Dec. 24, 2010.

* cited by examiner

*Primary Examiner* — Dao Phan
(74) *Attorney, Agent, or Firm* — Gowling Lafleur Henderson LLP

(57) ABSTRACT

Ephemeris data is downloaded intelligently to a GPS-enabled wireless communications device based on user activity rather than at fixed predetermined intervals. Ephemeris data can be downloaded to enable both Aided GPS and Assisted GPS. The device can download ephemeris data based on the frequency of requests into an API communicating with a GPS driver, based on the detection of a new network, or a change in time zone of the network time. Intelligent, adaptive downloading of ephemeris optimizes the usage of bandwidth and the data charge to the user while ensuring that ephemeris data is cached to provide assistance for location-based services such as turn-based navigation.

11 Claims, 5 Drawing Sheets

METHOD OF DOWNLOADING EPHEMERIS DATA BASED ON USER ACTIVITY

CROSS-REFERENCE TO RELATED APPLICATIONS

This application is a continuation of U.S. patent application Ser. No. 11/668,068 filed Jan. 29, 2007.

TECHNICAL FIELD

The present disclosure relates generally to wireless communications devices and, in particular, to techniques for obtaining ephemeris data for GPS-enabled wireless communications devices.

BACKGROUND

Most new wireless communications devices now include either embedded Global Positioning System (GPS) receivers or have suitable ports/interfaces for connecting to external GPS units, such as Bluetooth®-enabled GPS pucks. These GPS-enabled wireless communications devices can thus enable a variety of location-based services (LBS), such as turn-based navigation.

When a user wishes to start using GPS-based navigation or other location-based software on a wireless handheld device equipped with a GPS receiver, a precise location fix must first be established. This is done by synchronizing with at least four GPS satellite vehicles (SV's) in orbit. The time required to compute the location on a new synchronization is known as time-to-first-fix (TTFF). Unfortunately, this interval can become impractically long for various reasons. In fact, it can take 20 minutes or significantly longer to acquire a location fix in poor conditions, rendering navigation software unusable until then. As a result, the user can easily become frustrated.

In order to be able to find the satellites initially, a device with a GPS receiver normally contains an almanac of satellite location data that is imprecise but valid for several months. If a full reset occurs, then downloading the full almanac takes 12.5 minutes, with a maximum wait of 25 minutes. The almanac serves as a rough approximation of satellite location. To acquire a precise fix, the device must also obtain ephemeris data from each satellite itself which consists of very precise orbital and clock correction data, at a slow 50 bytes per second for a total of 12 seconds for ephemeris and 6 seconds for clock corrections. When the device retrieves this data directly from a satellite broadcast, it is operating in autonomous or standalone GPS mode, the most common mode of operation. The ephemeris data is cached by the receiver, but it becomes stale and unusable within 3 to 4 hours due to satellite drift due to various sources of error including ionospheric effects (which introduces an error of ±5 meters), ephemeris errors (which introduce an error of ±2.5 meters), satellite clock errors (±2 meters), multipath distortion (±1 meter), tropospheric effects (±0.5 meters), numerical errors (±1 meter or less). If the wireless handheld device loses synchronization because, for example, the user enters a building or subway and the ephemeris becomes stale, then a "cold start" condition occurs and new ephemeris must be downloaded again through a full sky search.

A problem that arises in addition to the latency involved in the broadcast data download is that one or more obstructions in the signal path can further delay the TTFF. Satellites broadcast their ephemeris every 30 seconds, 5 times per window. If the signal is interrupted, the receiver must wait for another cycle. Obtaining a fix can easily take several minutes or much longer if the user is travelling through an urban canyon or dense foliage. On a hot start, where current ephemeris data is still available, the time required to obtain a fix is reduced to seconds. However, if a user turns on the handheld device or emerges from a building so that the receiver has no valid ephemeris data in memory, then the user may typically need to wait a few minutes before a fix is established.

Also, the geography may be such that insufficient SV's are ever visible to obtain a fix through autonomous mode, as a reasonably high signal level of −130 dBm is required to download ephemeris. Thus, the user may be unable to reliably acquire a fix indefinitely.

To obtain a rapid TTFF, short-term ephemeris data can be obtained for Assisted-GPS (A-GPS) on networks such as CDMA. This consists of a system where the handheld GPS device obtains assistance data over-the-air from the nearest cellular network base station. Once the data is received, the handheld device combines this assistance data with ranging information on the satellites it can see or, alternatively, for a more precise fix, performs satellite pseudo-range calculations that are sent to the network's location server, which then returns a more precise location estimate. The device can then acquire and track weaker satellite signals down to −155 dBm in this mode of operation. Unfortunately, Assisted GPS has not been widely deployed in North America and Europe. The user may need to pay a charge per fix or a flat monthly fee to use the service, and the data is only good for about 4 hours.

An increasingly popular solution is to implement Extended Ephemeris (EE), also known as Aided-GPS. This new technology involves retrieval of current raw ephemeris from satellite broadcasts recorded by a reference network of receivers positioned strategically around the globe. Modelling is applied to the data to predict the future path of satellites, and so ephemeris is calculated for the next few days or longer. This extended ephemeris data is then made available for distribution from redundant location servers that can be accessed by mobile devices through TCP/IP on any wireless network. The data must initially be downloaded through a carrier network, but it does not rely on any specific implementation of GPS assistance by the carrier, making it useful around the world. The extended ephemeris can be used to reduce the TTFF to a couple of seconds even in the absence of network connectivity.

Despite these advances, the manner in which ephemeris data is downloaded, be it for Assisted GPS or for Aided GPS, is not optimal. Extended ephemeris data for Aided GPS is obtained by wireless communications devices at regular, predetermined intervals (e.g. every 3 days) without regard to the usage patterns of the user. For Assisted GPS, the ephemeris data is only requested when required, and thus conventional methods of obtaining ephemeris for Assisted GPS technology do not anticipate when ephemeris data is likely to be required. In both the Assisted and Aided GPS scenarios, the conventional manner of obtaining ephemeris data is "unintelligent" because it does not take into account the usage patterns of the user of the device. Accordingly, a method for intelligently obtaining ephemeris data for a wireless communications device remains highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides, in general, a method for downloading ephemeris data based upon user activity. Ephemeris data is downloaded intelligently in response to user activity, e.g. usage patterns of LBS applications, such as, for example, turn-based navigation applications rather than at fixed, preset intervals. By optimizing the timing and frequency of ephemeris downloads, bandwidth resources of the wireless networks are conserved and user data charges are minimized while preserving the capacity to access and use location-based services even if the device is operating in for protracted periods of time under difficult conditions.

In the main implementation, Extended Ephemeris data (that are valid for a number of days, e.g. usually 3 to 7 days) are downloaded in response to user activity to enable Aided-GPS data to assist GPS receivers when operating in poor conditions, e.g. in an urban canyon, under dense foliage or when passing temporarily through tunnels, subways or underground. In another implementation, short-term ephemeris can also be downloaded based on usage patterns or user activity to provide Assisted-GPS data (i.e. short-term ephemeris).

Thus, an aspect of the present technology is a method of method of managing a GPS receiver on a GPS-enabled wireless communications device, the method comprising determining a usage pattern relating to requests for position fixes and requesting ephemeris data based on said usage pattern.

Another aspect of the present technology is a computer program product that includes code adapted to perform the steps of the foregoing method when the computer program product is loaded into memory and executed on a processor of a wireless communications device.

Yet another aspect of the present technology is a GPS-enabled wireless communications device comprising an input device for interacting with the wireless communications device, a GPS receiver for receiving GPS signals from orbiting GPS satellites, a radiofrequency transceiver for receiving ephemeris data to assist the GPS receiver in determining a position fix for the wireless communications device, and a processor for determining a usage pattern relating to requests for position fixes and for requesting ephemeris data based on said usage pattern.

The details and particulars of these aspects of the technology will now be described below, by way of example, with reference to the attached drawings.

Figure 1:
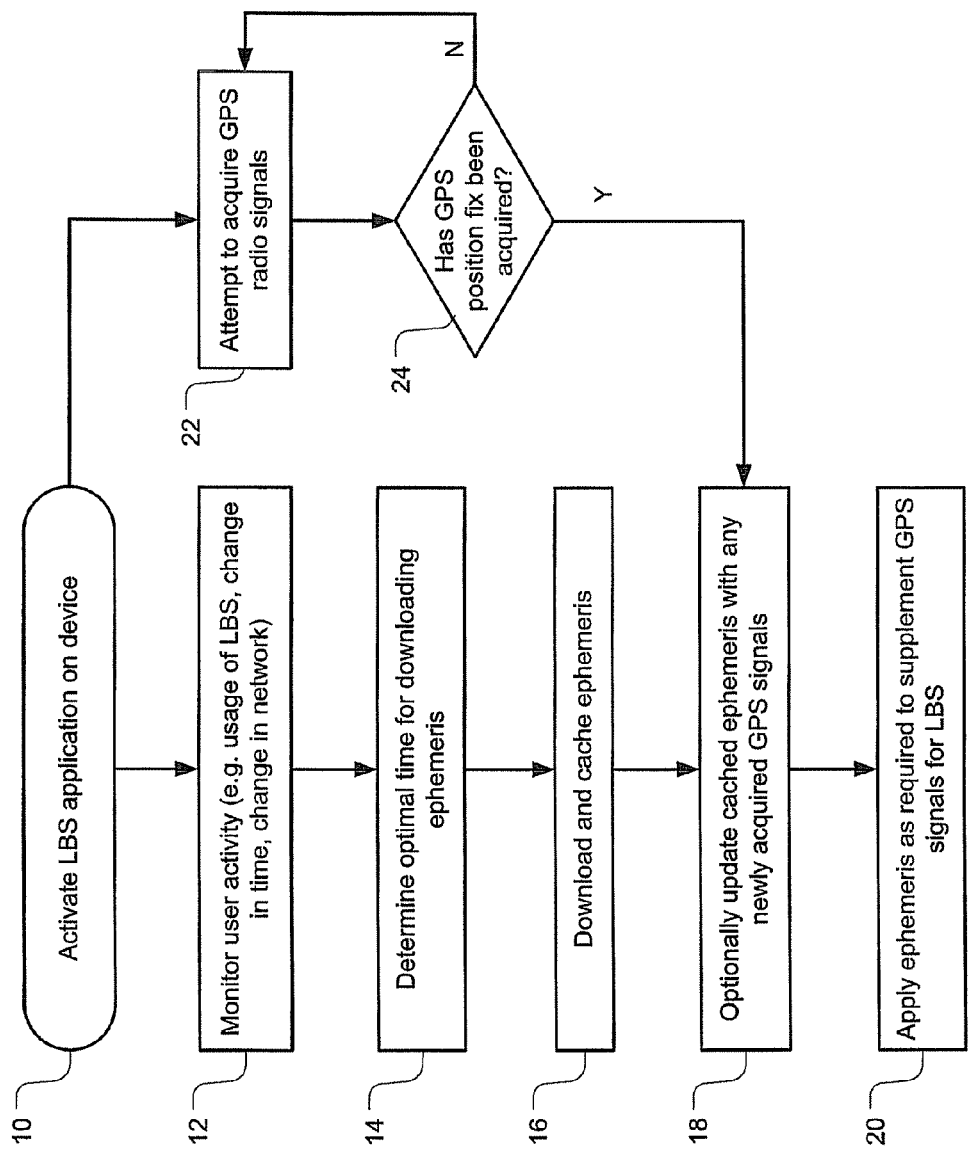
FIG. 1 is a flowchart outlining steps of a method of downloading ephemeris data.

FIG. 1 is a flowchart outlining steps of a method of downloading ephemeris data for a GPS-enabled wireless communications device. The method is initiated at step 10 by activating a location-based service (LBS) application. After the LBS application is launched, user activity is monitored (step 12) to determine whether ephemeris data should be downloaded and/or at what frequency the ephemeris data should be downloaded. For example, usage patterns of the LBS application, or other events such as a change of network or a change in time-zone can be used as indicators that new ephemeris data should be downloaded. While the step of monitoring user activity (step 12) can be performed by the device itself, it can also be performed by the network, e.g. the Network Operation Center (NOC) or other server. Alternatively, the device could collect data and send reports periodically to the NOC or other server in the network to enable the NOC or server to monitor user activity. At step 14, the optimal timing (frequency) for downloading the ephemeris is then determined based on the usage patterns of certain LBS applications or other user activity on the device. Short-term or long-term ephemeris data is then downloaded and stored and/or cached (step 16), as will be elaborated below.

As shown in FIG. 1, after the LBS application is launched, the GPS receiver onboard the wireless communications device attempts to acquire a GPS fix by acquiring at least three or four GPS radio signals from orbiting GPS satellites (step 22). At least three satellites are required for longitude and latitude coordinates. A fourth satellite is required to provide altitude. Sometimes, the GPS unit will attempt to acquire further satellite signals because the redundant signals enable the GPS unit to determine its position with even greater accuracy.

As is known in the art, a GPS receiver computes its current position by measuring each of the distances between itself and the orbiting GPS satellites from which it is receiving signals. Three such signals are required for a longitude and latitude fix, while a fourth signal is required for calculating altitude. By measuring the time delay between transmission and reception of each GPS signal, the distance to each satellite can be calculated since the signal travels at a known velocity. The signals also convey information about the satellites' location in orbit. Determining the position of three (or four) satellites thus enables the GPS receiver to compute its current position using a technique known as "trilateration". As most GPS receivers typically have inaccurate clocks, it is therefore necessary to track one or more additional satellites to correct for error in the receiver's clock.

As shown in FIG. 1, the acquisition of GPS radio signals can be performed in parallel with one or more of the monitoring, determining and downloading steps (steps 12, 14 and 16). If the GPS position fix is acquired (step 24), then the newly acquired GPS position fix can be used (optionally) to update the cached ephemeris data (step 18), as will be explained below in greater detail. Finally, as shown in the flowchart of FIG. 1, the ephemeris (or updated ephemeris, as the case may be) is applied (step 20) as required to assist the GPS receiver in determining its current position to provide a position fix for any requested LBS.

The foregoing method can thus be summarized as entailing steps of monitoring user activity (step 12) on the wireless communications device to determine whether ephemeris data should be obtained and then obtaining the ephemeris data based on the user activity (step 16). This method provides intelligent downloading of ephemeris tailored to the specific usage patterns of the user rather than unintelligently downloading ephemeris at fixed, predetermined intervals irrespective of the LBS-related behaviour of the user.

By way of example, monitoring user activity can involve monitoring user activity on a location-based service (LBS) application on the wireless communications device, such as a turn-based navigation application. In other words, launching a turn-based navigation application or other LBS software on the device would be noted by the device (or a monitoring application running in the background). Frequent (or prolonged) usage of a navigation application or other LBS application would be noted by the device (monitoring application). Ephemeris data would then be downloaded more frequently than for a user who rarely utilizes LBS on his device.

As another example, monitoring user activity can involve detecting whether the device has roamed to a new network to intelligently trigger the step of obtaining the ephemeris data if the device has roamed to a new network. If the device detects that it has roamed to a new network, then it would be prudent to download ephemeris because the user may have, for example, stepped off a plane in another part of the world where the cached ephemeris data is no longer valid (i.e. a condition known as a "cold start").

As a further example, monitoring user activity can involve detecting, from a change in a network time, whether a time zone has changed to intelligently trigger the step of obtaining the ephemeris data if the time zone has changed. Again, this step change in time zone may signify that the user is no longer in the same part of the world, i.e. the device has potentially moved to a place where the cached ephemeris data is no longer valid.

Yet another way of monitoring user activity entails monitoring the requests for GPS position data made into an API (e.g. a Java JRS 179 API) that communicates with the GPS driver that drives the GPS chipset. As will be elaborated below with respect to FIG. 5, determining a frequency of requests made into the API enables the device to intelligently trigger the step of obtaining the ephemeris data based on the frequency of requests into the API. For example, in a preferred implementation, ephemeris data is continually downloaded as long as there has been a location request to the JRS 179 in the last 30 days. If 30 days elapse without such a request being made, then the downloads cease until the user makes a new request to start a new 30-day window. The duration of the window can, of course, be varied in other implementations.

Preferably, the foregoing methods are used to obtain extended, long-term ephemeris data to provide Aided GPS. The extended ephemeris is valid usually for 2-3 days, although longer-term (but decreasingly accurate) ephemeris can be obtained for up to 7 days. The advantages of extended ephemeris (Aided GPS) are numerous, as follows:

1. Time-to-first fix is greatly reduced. Even with an unobstructed view, the norm for a satellite fix with a clear view of the sky is in the range of 40 to 60 seconds if the device has no up-to-date almanac, and no initial position, known as a cold start. If the device knows the current time, position, has an up-to-date almanac, but no current ephemeris cached, then it is a warm start, and the time is reduced to 30 to 40 seconds. EE can bring it down to approximately 10 seconds. In addition to making navigation applications more useful, it is an important safety consideration in terms of the E-911 system which locates an emergency service caller.

2. Users will normally be expected to move in and out of buildings, and travel inside of large cities where the view of the sky can easily be obstructed. EE allows a location fix to be obtained instantly, even at reduced signal levels. For instance, while a standard receiver requires signal strength of at least 28 dbHz for satellite correlation, a receiver using an aided start can acquire a signal down to −159 dBm. The device only needs to track the satellite it already knows the location of.

3. By knowing exactly where to look for satellites, significantly less power is consumed to maintain a GPS lock even in poor visibility conditions, such as indoors. The device does not need to wait for the receiver to decode navigation data for each satellite.

4. As long as the ephemeris data is not stale, the device can acquire a location fix even if there is no network connectivity. This is useful if the user is in an isolated location.

5. No cost to the user is incurred for each location fix as may be the case for assisted-GPS systems on carrier networks. If the user is roaming, then the ephemeris data can still be downloaded through the partner network, and only the standard packet data charge applies. The size of the data equates to about 10 e-mails.

6. There is no privacy concern over the carrier keeping track of a user's location assistance requests. Data for all satellites is downloaded at the same time.

7. Users can roam to any other network and still use their long-term ephemeris. Because the location of all satellites is stored on the device, the user may step off a plane anywhere in the world and still immediately obtain a fix. The lack of wide deployment of assisted-GPS by carriers is not an issue. The application layer is bearer-agnostic, so the user can operate irrespective of which network he is connected to (or not at all).

8. The EE data is long-term. If the user frequently loses satellite synchronization by constantly walking in and out of buildings, then 4-hour location data will not have to be downloaded multiple times a day as in assisted-GPS, thus avoiding overhead data costs for the user. The degradation of the data over time is insignificant.

9. The EE data can be theoretically formatted to be compatible with any GPS receiver.

Alternatively, the foregoing methods can be used to obtain short-term ephemeris data for Assisted GPS. In the former case, a 26 k-50 k file containing 3-7 days' worth of the Extended Ephemeris data is downloaded when warranted by the usage patterns or user activity. Downloading the extended ephemeris data intelligently based on user activity helps to ensure that the data is fresh (the data for the first day being more accurate than that for the second and third days due to the inevitable divergence between the predictive model and the actual drift of the satellites). Intelligently downloading the extended ephemeris data also ensures that the downloads are efficient both in terms of overall network bandwidth resources and user data charges. Regular, predetermined downloads of the ephemeris file, irrespective of usage patterns, as is done conventionally, is often wasteful. Consider the scenario where a user only rarely uses LBS or navigation. If the ephemeris is downloaded "unintelligently" (i.e. automatically or manually by the user) every 3 days, for example, then the user pays for the data charge and network bandwidth is used up, even if the ephemeris is not used. The present technology thus attempts to redress this problem by attempting to anticipate or predict when and how frequently ephemeris data should be downloaded to optimize network resources and user data cost while ensuring that the ephemeris data is usable and available at all times in case the user wishes to use LBS.

Figure 2:
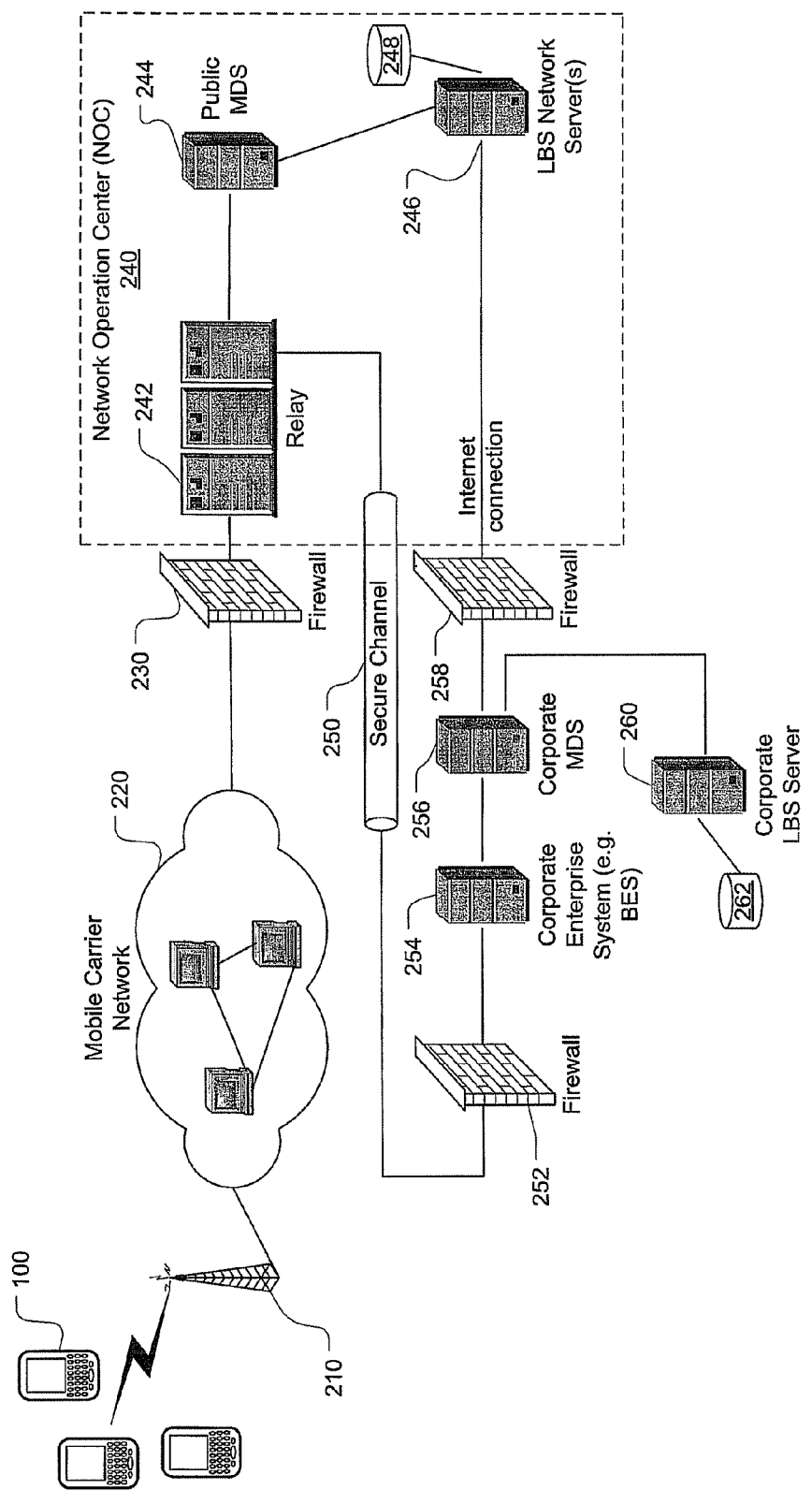
FIG. 2 is a schematic depiction of an exemplary network layout enabling wireless devices to access location-based services.

FIG. 2 is a schematic depiction of an exemplary network layout enabling wireless devices to access location-based services (LBS). As depicted in FIG. 2, one or more wireless communications devices 100 communicate wirelessly with a mobile carrier network 220 via one or more base station towers 210. The wireless communications devices can be wireless handhelds such as the BlackBerry® from Research in Motion Limited, but could also be other devices with GPS capabilities such as cellular phones, wireless-enabled PDAs, wireless-enabled laptops, etc.

As shown by way of example in FIG. 2, both private and public location-based services (LBS) can be accessed via the mobile carrier 220. For example, public LBS can be accessed via the Network Operations Center (NOC) 240 via a firewall 230. NOC 240 includes a relay 242, a public MDS 244 (e.g. BlackBerry® Mobile Data System™) which is connected to one or more LBS Network Servers 246 (each having their own LBS database 248). The relay 242 is also connected via a secure channel 250 via a firewall 252 to a Corporate Enterprise System (e.g. BES) and a Corporate MDS Server 256 which is, in turn, optionally connected to a Corporate LBS Server 260 (and its database 262). The Corporate MDS Server 256, in the example shown in FIG. 2, also has an Internet connection via another firewall 258 to the LBS Network Server 246.

Wireless communications devices 100 issue requests for LBS (including map data) to relay 242. These requests are passed via the secure channel 250 through firewall 252 to the corporate enterprise server 254 and corporate mobile data system (MDS) server 256. The LBS request is then passed via firewall 258 to a public location-based service (LBS) server 246 which provides location-based services (LBS) to handle the request. The network may include a plurality of LBS servers where requests are distributed and processed through a load distributing server. The LBS data may be stored on this network server 246 or in a database 248. Private corporate data stored on corporate LBS server(s) 260 may be added to, or superimposed on, the public data using corporate enterprise system 254 and corporate MDS server 256 on the secure return path to the wireless device 100. Alternatively, where no corporate servers are provided, the LBS request from the wireless device 100 may be passed via relay 307 to the public MDS server 244, which sends the request to the public LBS server 246 providing location-based services in response to the request.

Figure 3:
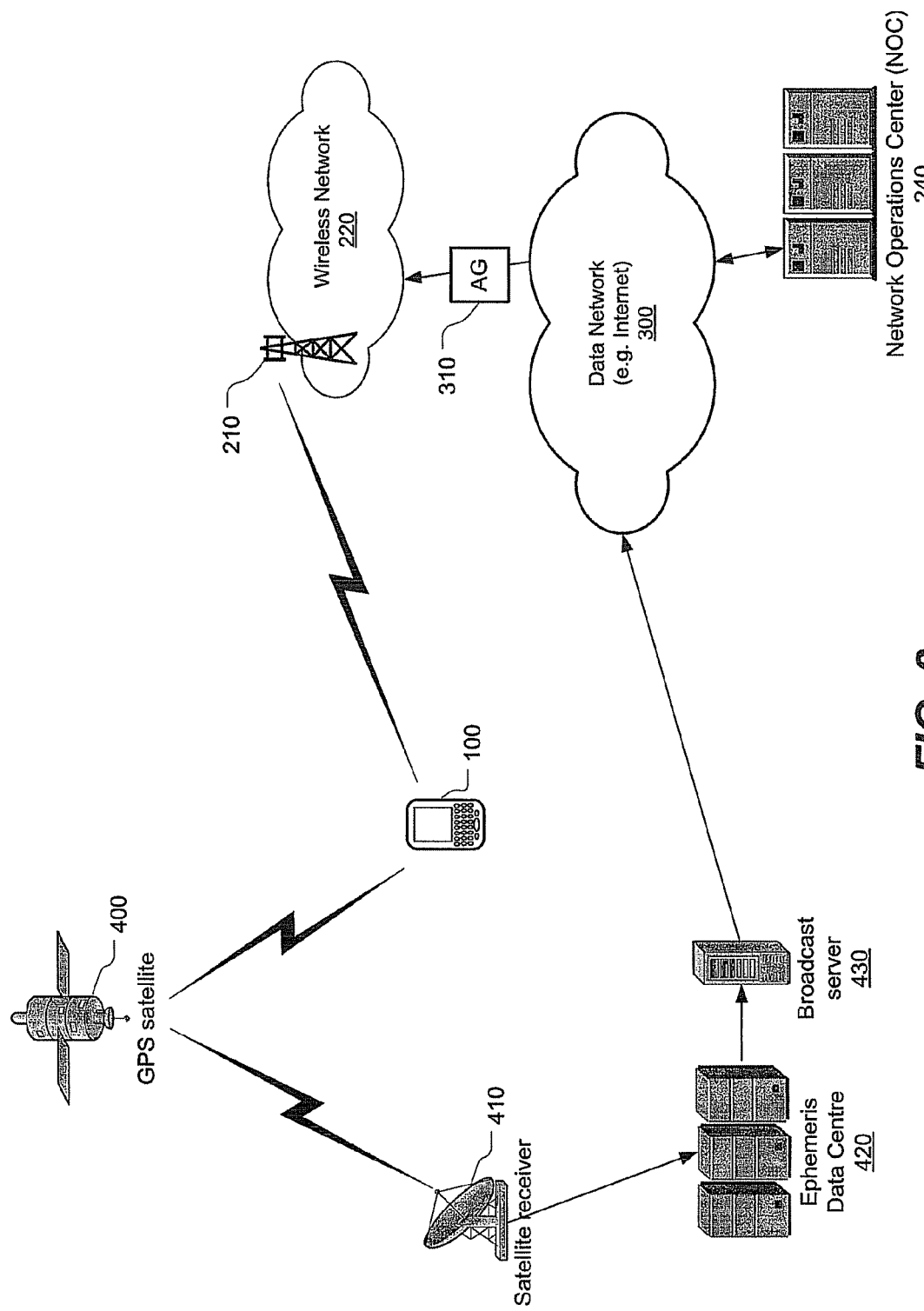
FIG. 3 is a schematic depiction of exemplary network components used to deliver ephemeris data to a wireless communications device.

FIG. 3 is a schematic depiction of exemplary network components used to deliver ephemeris data to a wireless communications device 100. When LBS is requested by the wireless communications device 100, the GPS chipset onboard the device attempts to acquire a GPS position fix by acquiring GPS radio signals from at least three or four different orbiting GPS satellites 400, as was described above. To expedite the time-to-first fix (TTFF), the wireless device 100 may utilize cached ephemeris data to assist the GPS trilateration function, thus reducing the time to calculate a precise location fix from minutes, as required in a standard sky search, to a few seconds or even less, thereby providing the user of the wireless device with virtually immediate access to location-based service applications such as turn-based navigation. The utility of the cached ephemeris data is inversely proportional to how old it is, i.e. how long ago the ephemeris was obtained. However, it would be too costly in terms of data charges and too burdensome on network bandwidth resources to be continually downloading new ephemeris data. The solution proposed is thus to intelligently download the ephemeris data in response to usage patterns and user activity to thus optimally provide both high-end GPS performance without incurring too much cost in terms of bandwidth usage and data charges.

As shown in FIG. 3, the ephemeris data is downloaded from the Network Operations Center (NOC) 240, preferably via a data network (e.g. the Internet) which relays the ephemeris data through a wireless network 220 via a base station tower 210 to the wireless communications device 100. Optionally, an Applications Gateway (AG) 310 can be provided between the data network 300 and the wireless network 220 to mediate and optimize the data flow by mapping complex data structures to structures optimized for wireless and vice versa.

As further depicted in FIG. 3, the NOC 240 receives regular ephemeris updates from a broadcast server 430. Preferably, these updates are sent via the data network 300. The broadcast server 430 is connected to an Ephemeris Data Centre 420 which calculates ephemeris data from GPS radio signals received by multiple satellite receivers 410 at various locations on the globe. The various satellite receivers 410 receive GPS signals from a number of the 24-27 GPS satellites in orbit at any one time. The GPS signals received by the receivers 410 are transmitted to the Ephemeris Data Centre 420 where the received GPS signals are used to compute exact satellite positions for the GPS satellites. The Ephemeris Data Centre 420 also predicts, using a predictive model that predicts satellite drift by taking into account ionospheric and other effects, the likely path that each satellite will take over the next 3 to 7 days. The ephemeris data thus enables the GPS chipset to establish positions for the other satellites once it has a fix on at least one GPS satellite. The accuracy of the ephemeris, of course, decreases with time. Thus, the ephemeris for day 1 is more accurate than for day 2. Day 3 ephemeris is even less accurate, and so on. Accordingly, while ephemeris for up to day 7 can be predicted, it is preferable not to have to rely on ephemeris data past, say, day 3. Thus, in the preferred implementation, the ephemeris data is downloaded based on user activity but should not be downloaded with a frequency less than every three days in order to ensure that it is always "fresh", i.e. not older than 3 days. Of course, a cut-off of 3 days is arbitrary, since the accuracy diminishes with time, and thus the implementation could be tweaked to ensure that the device does not have to rely upon ephemeris older than, for example, 2 days or 4 days (or any another time period less than about 7 days).

In one implementation, therefore, the NOC 240 obtains long-term ephemeris data from a reliable IP application server host (e.g. the broadcast server 430 which in turns obtains the data from the Data Centre 420). Ephemeris data is then pushed to all GPS-enabled handheld devices 100 through all relevant wireless networks 220. A poll mechanism could be used, instead, where the device could request ephemeris data based on the age of its copy and activity pattern of GPS applications. Various vendors apply various astronomical and ionospheric force calculations to broadcast ephemeris data to extrapolate it to a 2-week duration or even longer. Specifically, raw ephemeris data is smoothed out and interpolated in order to perform forecasting of satellite drift. Up to 7 days of synthetic ephemeris data can be distilled to a small file and hosted on one or more Broadcast Servers using HTTP.

This extended ephemeris data then remains valid even when there is loss of connectivity with the carrier network. This extended ephemeris (aided-GPS data) degrades much more slowly over time than assisted-GPS data. Although ephemeris data good for 3 days is currently offered, most wireless users are rarely in a state where they are not connected with the network and cannot receive updates. Thus, it may be unnecessary to extend the ephemeris beyond 2 days or 3 days. At any rate, the data beyond about 3 days is of dubious accuracy not only due to satellite drift but also due to the possibility that a GPS ground control station adjusts by remote control the trajectory of one or more of the GPS satellites, which of course introduces an error into the forecasted ephemeris.

The ephemeris data could be transferred to the handhelds in a number of standard ways, e.g. by downloading the data file using TCP/IP. For example, with support from the standards body, SUPL (Secure User Plane Location architecture) could allow extended ephemeris to be transferred directly from a location server, called Serving Mobile Location Center (SMLC), to the mobile handset client using secure end-to-end IP connectivity.

Providing timely ephemeris updates ("assistance data") based on usage patterns thus helps to efficiently overcome the performance limitations of conventional GPS, thus enhancing GPS sensitivity while enabling operation under difficult signal conditions, such as indoor environments, urban canyons or under dense foliage.

Figure 4:
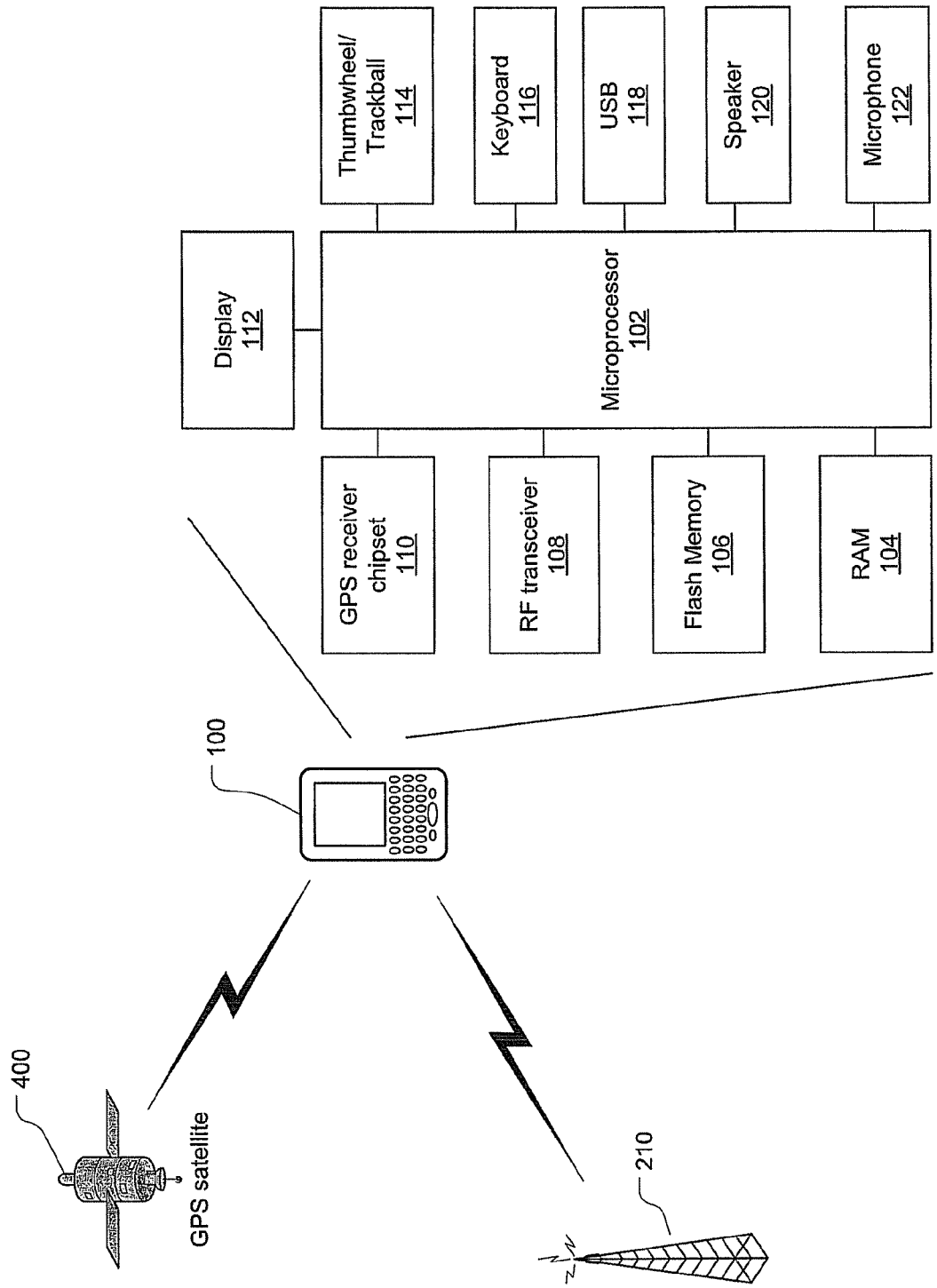
FIG. 4 is a block diagram depicting certain key components of a GPS-enabled wireless communications device.

FIG. 4 is a block diagram depicting certain key components of a GPS-enabled wireless communications device 100. It should be expressly understood that this figure is intentionally simplified to show only certain components; the device 100 of course includes other components beyond what are shown in FIG. 1. The device 100 includes a microprocessor 102 (or simply a "processor") which interacts with memory in the form of RAM 104 and Flash Memory 106, as is well known in the art. The device 100 includes an RF transceiver 108 for communicating wirelessly with base stations 210. The device 100 includes a GPS receiver chipset 110 for receiving GPS radio signals transmitted from one or more orbiting GPS satellites. In terms of input/output devices or user interfaces, the device 100 typically includes a display 112 (e.g. a small LCD screen), a thumbwheel and/or trackball 114, a keyboard 116, a USB 118 or serial port for connecting to peripheral equipment, a speaker 120 and a microphone 122. Ephemeris data is received through the RF transceiver 108. Controlled by the processor 102, the ephemeris data is then stored as a data file in flash memory 106.

The first fix can typically be obtained in 8 to 10 seconds, with only one satellite being visible. The system will continue to work without interruption in continuous mode with a signal level of 28 dBHz from only one SV. The size of the 3-day data file, containing ephemeris for all SV's in orbit that can be tracked (approximately 27 of them) is about 26 kb compressed. It must be downloaded in its entirety. The size of 7-day data file is about 50 kb compressed. The first-day data has greater accuracy than the broadcast, but then the data degrades in accuracy as time elapses. The entire range is still very usable in standard location-based applications.

Figure 5:
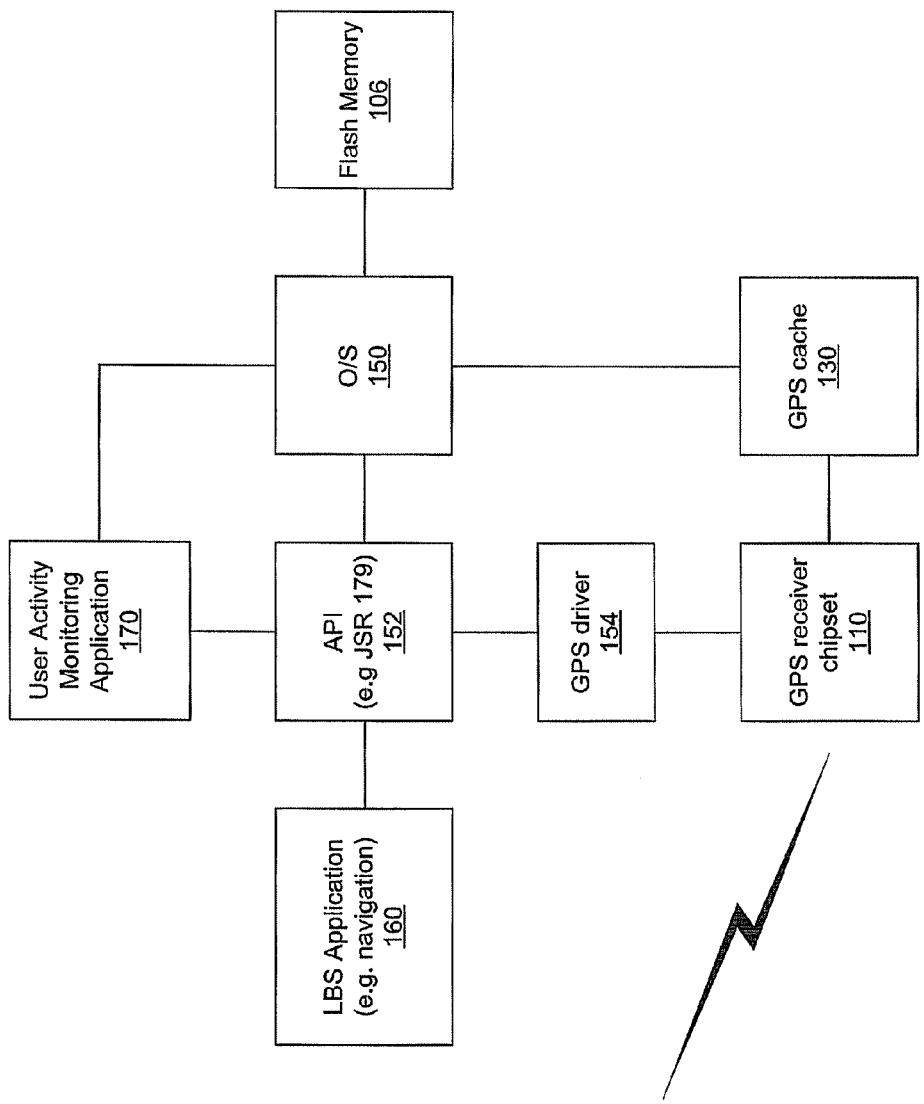
FIG. 5 is a block diagram depicting the components used to monitor user activity on a wireless communications device in order to determine when to download ephemeris data.

FIG. 5 is a block diagram depicting the components used to monitor user activity on a wireless communications device 100 in order to determine when to intelligently download ephemeris data for optimizing user cost, network bandwidth and GPS performance.

When operating in autonomous mode, the GPS receiver chipset 110 receives radio signals from at least 3 orbiting GPS satellites (for a longitude-latitude position fix) or from at least a fourth satellite if the GPS chipset is to provide an altitude estimate as well. Some GPS chipsets will seek to acquire additional signals from further satellites for higher accuracy.

On the other hand, where assistance data (ephemeris data) is required to supplement the GPS signals to provide a fix, e.g. from a cold start, the ephemeris data stored in flash memory 106 is uploaded to a GPS cache 130. The cached ephemeris data is then fed into the GPS receiver chipset 110 to enable the GPS chipset to determine the positions of other satellites (for which is has yet to acquire a signal) based on receipt of a radio signal from at least one GPS satellite, i.e. based on "direct" knowledge of the position of at least one satellite in the sky. In other words, if the GPS chip can acquire at least one satellite, then it can use the ephemeris to compute (predict) where the other satellites should be, which thus enables the GPS chip to provide a fairly accurate estimate of its current position. The ephemeris data thus aids or assists the GPS in producing a fix.

In a preferred implementation, the ephemeris data is downloaded based on user activity, e.g. usage patterns of LBS applications. For example, when a request is made into the API 152 (e.g. Java JRS 179) for GPS data, the request is logged by a user activity monitoring application 170. The API 152 preferably resides between the operating system 150 and the LBS application 160 so that all GPS requests go through this API. All location requests from the LBS application 160 to the API 152 go to the GPS driver 154 via the OS 150, as shown in FIG. 5, which then communicates with the GPS chipset 110. The API is, in this example, Java JRS 179 . JRS 179 ("Location API") is a specification defining a common API for retrieving location information on a variety of GPS-embedded mobile phones, PDAs, handhelds and other such devices.

Likewise, if an LBS application (e.g. a turn-based navigation application) is launched or used frequently (or infrequently), the user activity monitoring application 170 will monitor the usage of the LBS application either directly or (indirectly) by the requests that the LBS application makes through the API 152 to the GPS driver 154 for GPS data. In other words, logging/monitoring requests through the API 152 for the GPS driver to obtain GPS fixes from the GPS chipset 110 provides an indication of user activity and allows the user activity monitoring application to develop usage patterns for the LBS software or GPS requests in general.

If the GPS receiver acquires a position fix from further GPS radio signals (i.e. further satellites become "visible" to the GPS receiver), then the ephemeris data in the cache can be updated or modified to reflect the "directly obtained ephemeris", i.e. the "actual" positioning of the satellites. For example, the ephemeris data in the cache can be flushed and replaced with the newly updated ephemeris derived from the GPS fix. Alternatively, if a satellite's orbit is readjusted by a ground controller, for example, then the current ephemeris data from the satellite broadcast can be used to replace the portion of the extended ephemeris data that has been invalidated by the readjustment.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant is therefore intended to be limited solely by the appended claims.

The invention claimed is:

1. A method of managing a GPS receiver on a GPS-enabled wireless communications device, the method comprising:
   determining a usage pattern relating to requests for position fixes to predict when ephemeris data should be obtained; and
   requesting the ephemeris data based on said usage pattern.

2. The method as claimed in claim 1 wherein determining the usage pattern comprises determining a frequency of requests made into an API communicating with a GPS driver that drives a GPS chipset on the wireless communications device.

3. The method as claimed in claim 1 wherein determining the usage pattern comprises determining a pattern of user activity relating to a location-based service (LBS) application on the wireless communications device.

4. The method as claimed in claim 1 wherein determining the usage pattern comprises determining a pattern of user activity relating to a navigation application on the wireless communications device.

5. A non-transitory computer-readable medium comprising code which when loaded into memory and executed by a processor a wireless communications device cause the device to:
   determine a usage pattern relating to requests for position fixes to predict when ephemeris data should be obtained; and
   request the ephemeris data based on said usage pattern.

6. A GPS-enabled wireless communications device comprising:
   an input device for interacting with the wireless communications device;
   a GPS receiver for receiving GPS signals from orbiting GPS satellites;
   a radiofrequency transceiver for receiving ephemeris data to assist the GPS receiver in determining a position fix for the wireless communications device; and
   a processor for determining a usage pattern relating to requests for position fixes to predict when the ephemeris data should be obtained and for requesting the ephemeris data based on said usage pattern.

7. The wireless communications device as claimed in claim 6 wherein the usage pattern is determined based on a frequency of requests made into an API communicating with a GPS driver that drives a GPS chipset on the wireless communications device.

8. The wireless communications device as claimed in claim 6 wherein the usage pattern relates to a pattern of requests made by a location-based service application.

9. The wireless communications device as claimed in claim 6 wherein the usage pattern relates to a pattern of requests made by a navigation application.

10. The wireless communications device as claimed in claim 6 wherein the usage pattern is determined by a user activity monitoring application that monitors usage of on the device.

11. The wireless communications device as claimed in claim 10 wherein the user activity monitoring application collects usage data on usage patterns related to requests for position fixes and wherein the radiofrequency transceiver periodically transmits the usage data to a server to enable the server to assess when to provide ephemeris data.

* * * * *